T. THOMSON.
ROWLOCK.
No. 176,818. Patented May 2, 1876.
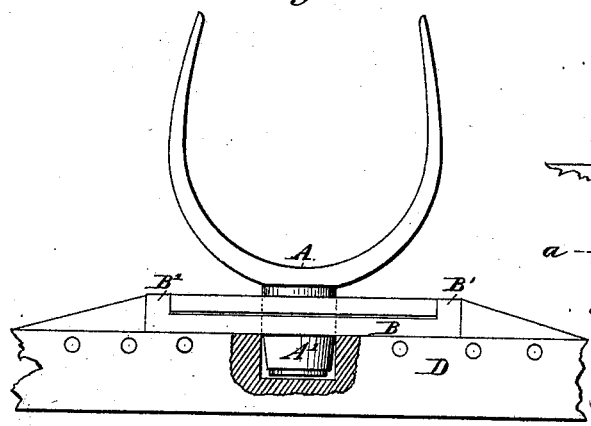
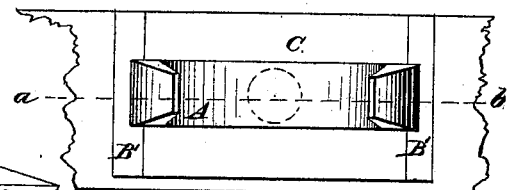
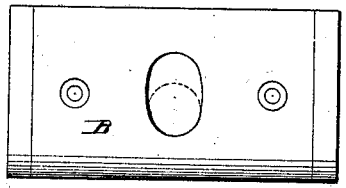
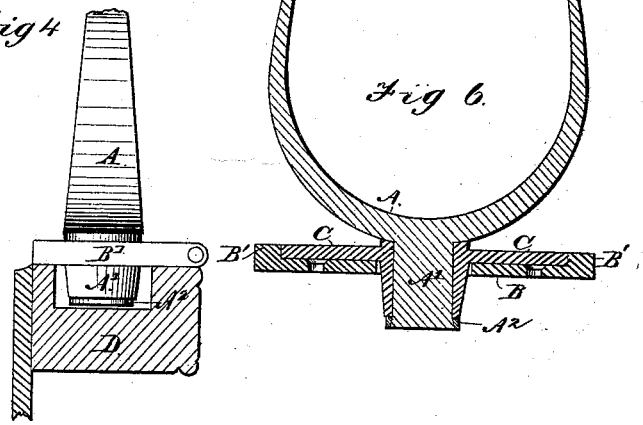
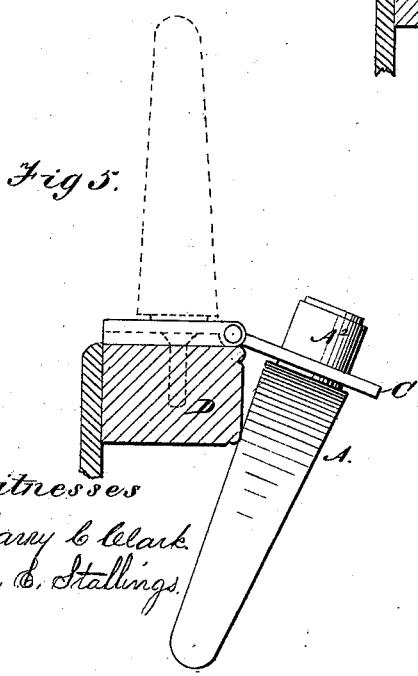
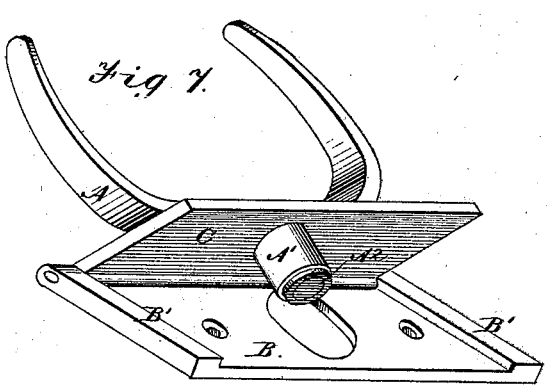
Witnesses
Harry C. Clark
M. E. Stallings
Inventor
Thomas Thomson
by H. W. Beadle & Co.
Attys

UNITED STATES PATENT OFFICE.

THOMAS THOMSON, OF BLUFF HARBOR, OLAGO, NEW ZEALAND.

IMPROVEMENT IN ROWLOCKS.

Specification forming part of Letters Patent No. 176,818, dated May 2, 1876; application filed April 7, 1876.

*To all whom it may concern:*

Be it known that I, THOMAS THOMSON, of Bluff Harbor, Olago, in the Colony of New Zealand, harbor-master, have invented certain Improvements in Rowlocks for Boats, of which the following is a specification:

This invention of improvements in rowlocks for boats has been designed for the purpose of insuring the presence of these essentials on all occasions, and at the same time prevent those injuries which boats frequently receive from the rowlocks coming in contact with the ship's side.

To accomplish this I attach my rowlocks to a hinge, so as to turn inboard and under the gunwale, when not required to be used. By this means they are always at hand when wanted, and out of the way when not required for present use.

According to my invention one plate of a hinge is screwed or otherwise affixed to the gunwale of the boat, or to the rowlock-plate, while the other and upper one is free and receives the stem or shank of the rowlock through a hole in its center. The hinge should be on that edge of the lower plate which points inside the boat, so that the upper one with the rowlock attached may be turned inboard and underneath the gunwale. For the sake of gaining strength, I have ridges on each end of the lower plate, between which the upper plate closely fits. To enable the upper plate to sit down closely upon the lower one, an oblong hole is made in the center of the latter, to permit of the passage of the lower end of the stem or shank of the rowlock. This stem may be rigidly affixed to the upper plate, or may be connected thereto by a clinch and washer, so as to enable it to revolve freely on its bearings, (which is the method I prefer,) or it may fit into a socket in the upper plate instead of in the hole first described. Furthermore, there may be a hole made in the gunwale or in the rowlock-plate to receive the lower end of the stem or shank of the rowlock, if it should be long enough to require it. And again, this hole may be made quite through the gunwale, so as to allow of the use of a common rowlock or thole-pin, if so desired.

Referring, now, to the drawings hereto attached, Figure 1 represents side elevation of a rowlock, constructed, supported, and arranged according to my invention. Fig. 2 represents plan of top plate; Fig. 3, plan of bottom plate; Fig. 4, end elevation, when rowlock is in position for rowing; Fig. 5, same view when rowlock is turned inboard out of the way; Fig. 6, longitudinal section on line $a\,b$, Fig. 2; and Fig. 7, perspective of the whole when in the act of turning on its hinge.

A is the rowlock, $A^1$ its stem or shank, and $A^2$ the washer thereon. B is the lower plate of the hinge, and C the upper. B' B' are the ridges at each end of the lower plate B. D is the gunwale of the boat.

Having thus described the nature of my invention, and the manner of performing same, I would have it understood that I do not confine myself to precise details so long as the nature of my said invention be retained; but

I claim—

The combination of the plate B, having the projections B', with the plate C carrying the rowlock, as described.

THOS. THOMSON.

Witnesses:
 JOHN MCLEAN,
 JAS. SALRAND.